July 8, 1952 — G. A. KOHOUT — 2,602,342
VARIABLE SPEED DRIVE
Filed Feb. 20, 1950 — 2 SHEETS—SHEET 1
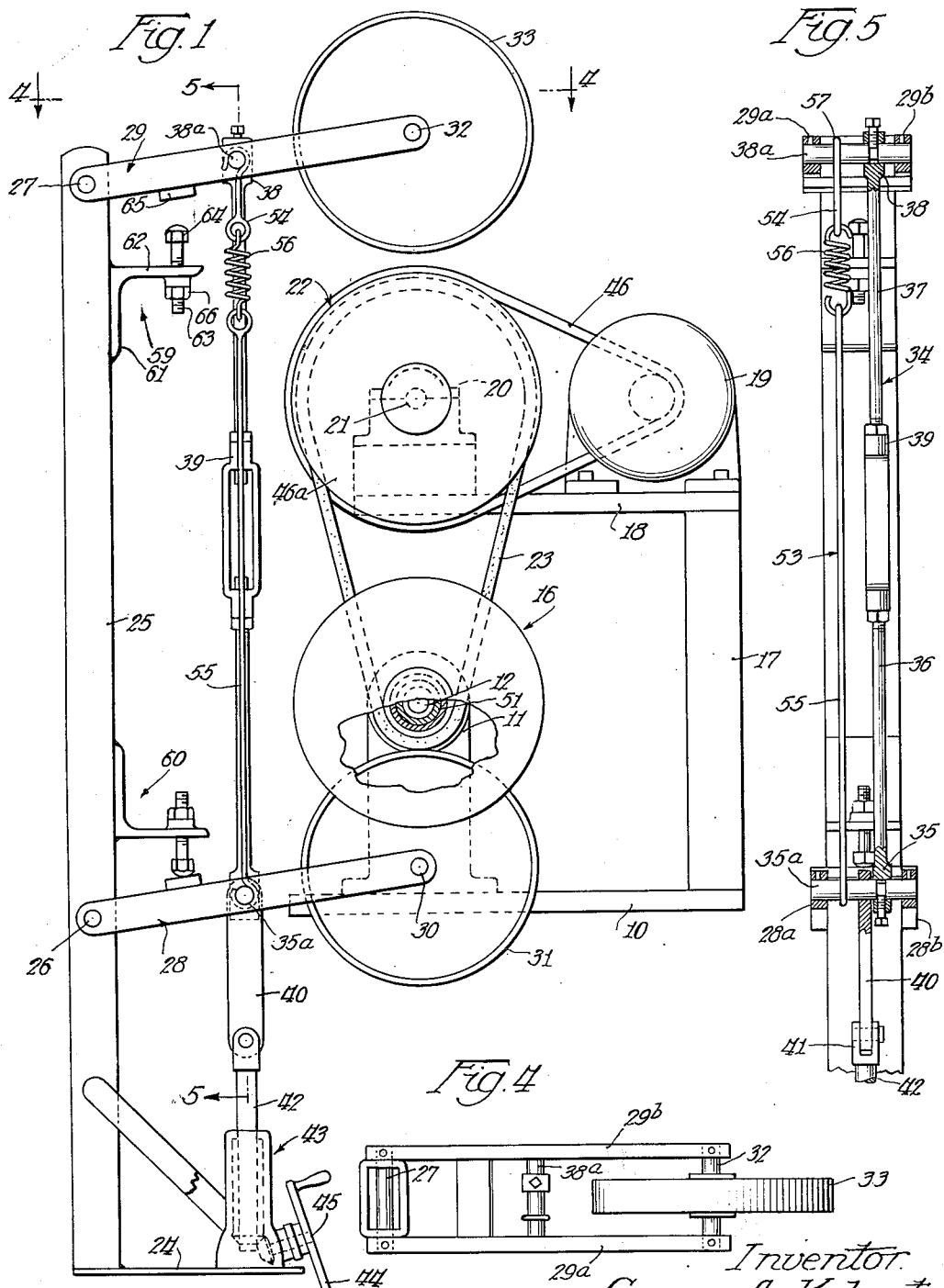
Inventor
George A. Kohout
By Zabel and Gritzbaugh
Attys

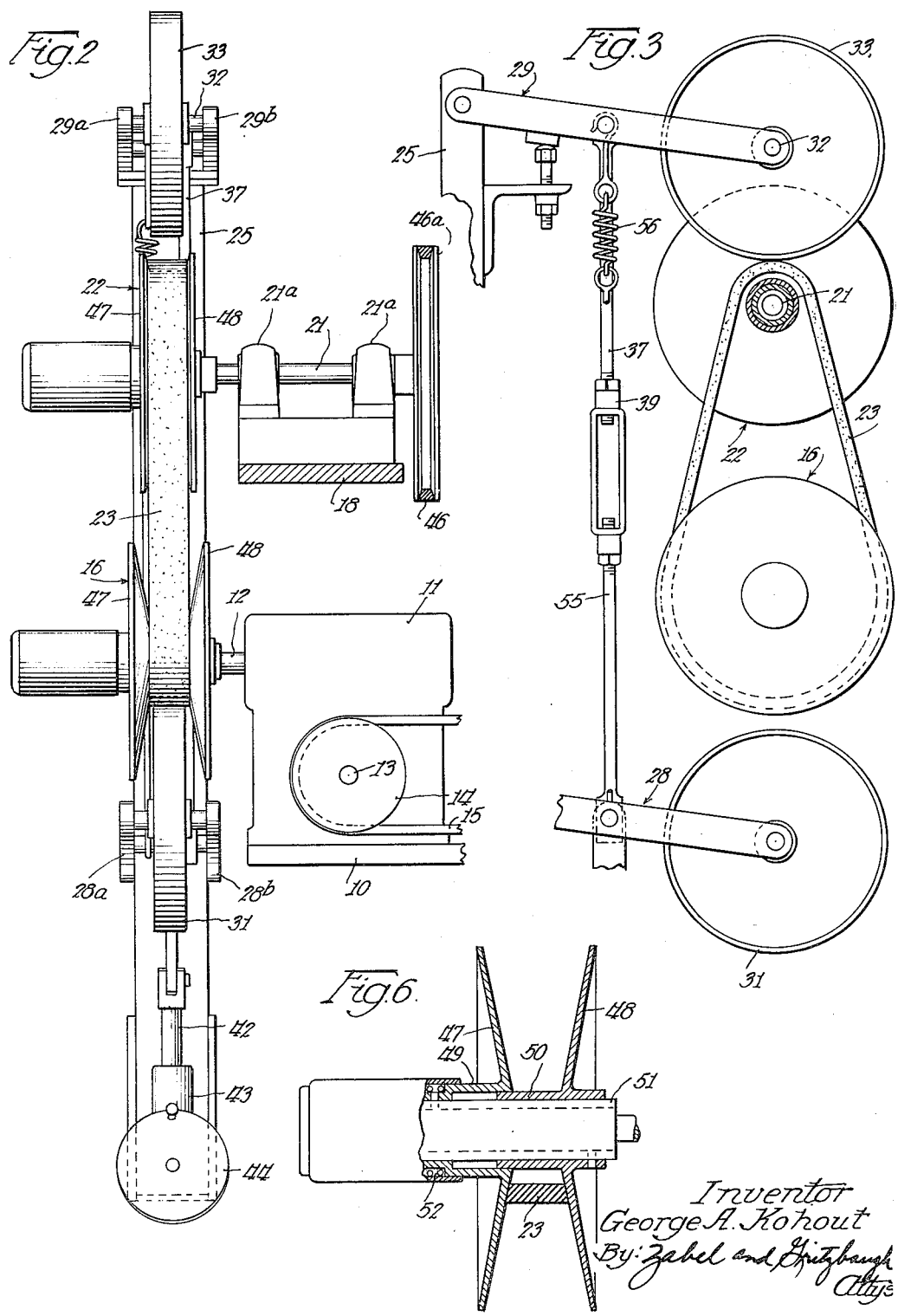

Patented July 8, 1952

2,602,342

UNITED STATES PATENT OFFICE 2,602,342

VARIABLE SPEED DRIVE

George A. Kohout, Chicago, Ill.

Application February 20, 1950, Serial No. 145,217

3 Claims. (Cl. 74—230.17)

The present invention relates to a variable speed drive mechanism that is effective in providing wide variations in driving speeds from a fixed speed prime mover. The present variable speed drive is intended for use between a prime mover such as a motor, and a mechanism or machine that is to be driven from the motor and the variation in speeds can be accomplished simply and quietly by the mere turning of a wheel or arm. The wear and tear on the prime mover and on the parts making up the variable speed drive are reduced to the very minimum by the use of the present invention.

The foregoing constitute some of the principal objects and advantages of the present invention, others of which will become apparent from the following description and from the drawings, in which Fig. 1 is a side elevational view of a variable speed drive embodying the present invention, a portion of one of the pulley wheels being broken away and shown in section and the belt on the pulley wheels being disposed in position for the highest speed ratio for the driven pulley wheel;

Fig. 2 is an end elevational view of the variable speed drive shown in Fig. 1;

Fig. 3 is a fragmentary side elevational view of the mechanism illustrated in Fig. 1 but showing the belt for the pulley wheels disposed in the slowest speed relationship for the driven pulley wheel;

Fig. 4 is a top plan view of the mechanism illustrated in Fig. 1;

Fig. 5 is a vertical sectional view taken through a portion of the mechanism, the view being taken along line 5—5 of Fig. 1; and Fig. 6 is a detail, horizontal sectional view shown partly in elevation of one of the pulley wheels.

For purposes of illustration a single embodiment only of the present invention has been selected and will be described hereinafter. It is recognized, of course, that modifications may be made in the embodiment illustrated without departing from the intended scope of the invention.

Referring now to the drawings and particularly to Fig. 1 the invention is illustrated in the form of a variable speed drive mechanism that includes a base 10 upon which is mounted a transmission unit 11, as best shown in Figs. 1 and 2. This transmission unit 11 per se forms no part of the present invention but includes a shaft 12 that is drivingly connected to a driven shaft 13. Mounted on shaft 13 in turn is a pulley wheel 14 that is drivingly connected by means of a suitable belt 15 to the machine or mechanism that is to receive its power from the variable speed drive. Mounted on shaft 12 is a lower variable speed pulley wheel generally indicated at 16.

Extending upwardly from the base 10 (see Fig. 1) is an upstanding frame member 17 on the top of which is mounted a platform 18 that supports a motor 19. At the other end of the platform 18 is a suitable bearing member 20 that supports a shaft 21. Mounted on this shaft 21 is an upper variable speed pulley wheel generally indicated at 22. Mounted to operate over both the upper and lower pulley wheels 22 and 16 respectively is a V-belt 23.

Again referring to Fig. 1 mounted adjacent to the pulley wheels 16 and 22 is a base 24 upon which is mounted an upstanding pedestal 25. Pivotally mounted on the pedestal 25 at 26 and 27 respectively are lower and upper arms 28 and 29. The lower arm 28 is made up of a pair of arm segments 28a and 28b, best shown in Fig. 5, and mounted at the free ends of these arm segments 28a and 28b is a shaft 30. Rotatably mounted on shaft 30 is a lower pressure wheel or roller 31. Similarly the upper arm 29 is made up of spaced apart arm segments 29a and 29b shown in Fig. 5, and mounted at the ends of these arm segments 29a and 29b is a shaft 32 upon which is rotatably mounted an upper pressure wheel or roller 33. Extending between the lower and upper arms 28 and 29 is a strut member 34 that has at its lower end a collar-like portion 35 that is adapted to be mounted on a shaft 35a. This strut member 34 includes a lower rod 36 that is integral with the collar portion 35 and an upper rod 37 that has at its upper end a collar portion 38 that is adapted to be mounted on a shaft 38a. Connecting the lower and upper rods 36 and 37 is a turnbuckle 39. Thus the arms 28 and 29 are held apart in proper spaced relationship by the strut member 34, the proper spacing being secured by manipulation of the turnbuckle 39.

Extending downwardly from the lower arm 28 is a lug 40 that is pivotally mounted on its upper end on the shaft 35a and on its lower end between bifurcated jaws 41 that are disposed on the upper end of a plunger 42 forming part of a raising and lowering jack generally indicated at 43. This jack 43 per se forms no part of the present invention as there are many different types that will serve satisfactorily in the present device. This jack 43 includes a manipulating handle or wheel 44 that is mounted on a shaft 45, which in turn through suitable gearing is operatively connected to the plunger 42. Thus by rotating the operating wheel 44 in one direction the plunger 42 is raised and by rotating the operating wheel 44 in the other direction the plunger 42 is lowered. The raising and lowering of plunger 42 in turn causes a lowering and raising of arms 28 and 29 about their respective pivots 26 and 27. The upper shaft 21 is journalled as at 21a (see Fig. 2) and is belt driven from the motor 19 by means of a belt 46 operating on a pulley 46a that is fixed to the shaft 21. Thus as the motor 19 is operated, both the upper and lower pulley wheels 22 and 16 are caused to rotate, the latter through the V-belt connection 23. The rotation of the lower pulley wheel 16 in turn causes rotation of the shaft 12 (see Fig. 2), which in turn through the gear mechanism in the transmission unit 11, transmits driving force to the drive belt 15 that is connected to the machine or mechanism to be driven (not shown).

The variable speed drive pulleys 16 and 22 are identical and for purposes of illustration one is shown in Fig. 6. This variable speed pulley per se forms no part of the present invention and consequently for complete details of a suitable variable speed pulley, reference may be had to United States Patent No. 2,475,954, issued to Willard E. Gerbing on July 12, 1949. This suitable pulley includes generally a pair of horizontally spaced disc members 47 and 48, each having a hub portion 49 and 50 respectively. These hub portions 49 and 50 are concentrically mounted on a pulley shaft 51 and as is explained in detail in the Gerbing patent, are adapted to slide away from each other and toward each other so as to vary the space between the discs 47 and 48. A suitable spring which is generally indicated in Fig. 6 at 52 normally urges the discs 47 and 48 toward each other so that the separation of these two discs is effected against the operation of the spring 52 in the manner described in the Gerbing patent. Though as previously mentioned the details of the structure of the pulley wheels 16 and 22 are of no importance, it is essential that pulley wheels be used where both of the discs 47 and 48 move substantially an equal distance when the space therebetween is varied. The reason for this will be made clear presently.

Referring now to Fig. 2 it will be noted that the width of pressure rollers 31 and 33 is somewhat less than the width of the V-belt 23. Thus when either of the pulley wheels 16 or 22 is brought into engagement with the V-belt 23, the pulley wheel at all times is confined within the side edges of the V-belt. As pressure is applied by one of the pressure rollers 31 or 33 against the V-belt 23 the sides or discs 47 and 48 of the adjacent pulley wheel 16 or 22 are caused to move apart, but since both of them move substantially an equal distance as previously mentioned, there is no lateral movement of the belt 23 as viewed in Fig. 2. Thus at all times the lateral positions of the pressure rollers 31 and 33 and the V-belt 23 against which they act are fixed. Since both of the pressure rollers 31 and 33 are narrower than the V-belt 23 upon which they act and further since there is no lateral displacement or movement of the V-belt or of these pressure rollers, neither of the pressure rollers 31 or 33 is ever allowed to come in contact with any part of the pulley discs 47 and 48. This results in quiet operation of the present device and eliminates friction and wear that would otherwise be present.

Initially the spacing between pressure rollers 31 and 33 is adjusted by manipulation of the turnbuckle 39 so that whenever either of the pressure rollers 31 or 33 is brought into engagement with the V-belt 23 the other pressure roller is entirely out of engagement with the V-belt. Thus the spacing between pressure rollers 31 and 33 is slightly greater than the distances between the upper and lowermost faces or edges of the V-belt 23.

In the position shown in Fig. 1 the variable speed drive is transmitting power from the motor 19 to the transmission unit 11 shown in Fig. 2 in such a manner that the transmission unit 11 is being driven at its highest rate of speed. This is due to the ratio in drives between pulleys 22 and 16 by virtue of the position of the V-belt on these two pulleys. Under these circumstances the jack unit 43 has been adjusted so that the lower pressure roller 31 is disposed in its uppermost position holding the V-belt 23 in the innermost position on the lower pulley wheel 16, at which time the pulley discs 47 and 48 of the lower pulley wheel 16 are spaced apart their maximum distances. This position of the pulley 16 is illustrated in Fig. 6 where the V-belt 23 is shown riding on the smallest diameter of the pulley.

In order to decrease the speed of the transmission unit 11 the jack member 43 is adjusted by manipulation of the operating wheel 44 so as to lower the lower pressure roller 31, thereby causing the spring 52 (Fig. 6) in the lower pulley 16 to force the pulley discs 47 and 48 toward each other. After the lower pressure roller 31 has been lowered as viewed in Fig. 1 to a position where the V-belt 23 is riding on the same diameters of both the upper and lower pulleys 22 and 16, the springs in both of the upper and lower pulleys have reached a balanced condition so that as the lower pressure roller 31 is continually lowered, it leaves or becomes disengaged from the V-belt 23. Upon further rotation of the operating wheel 44 of jack 43 in the same direction, the upper pressure wheel 33 is brought into engagement with the V-belt 23 and as the operation proceeds the upper pressure roller 33 moves downwardly so as to force the V-belt to the position shown in Fig. 3 where the V-belt is now riding on the shortest diameter of the upper pulley wheel 22 and at the same time is riding on the longest diameter of the lower pulley 16. During this adjustment cycle the speed of operation of the transmission unit 11 has been decreased from its maximum high speed to its minimum low speed and, of course, the manipulation of the manipulating wheel 44 can be discontinued at any position between these two limits to effect any desired speed ratio between the motor 19 and the transmission unit 11.

In order to take up any slack that may be present in the strut member 34 which may exist, particularly in the turnbuckle 39, a slack take-up member generally indicated at 53 (best shown in Figs. 1 and 5) may be employed. This slack take-up member 53 includes an upper and lower rod 54 and 55 respectively, held together by means of a tension spring 56. The upper rod 54 is hooked onto the shaft 38a as indicated at 57 and the lower rod 55 is hooked onto the shaft 35a as indicated at 58.

The upper and lowermost positions for the rollers 31 and 33 are limited by means of upper lower stop members indicated respectively at 59 and 60. Each of these stop members includes a bracket 61 mounted on the pedestal 25 that has an outstanding arm 62 in which is adjustably mounted a screw 63 having an adjustment hub 64 that engages a plate 65 on the adjusting arm 28 or 29. A nut 66 is threaded on the screw and is adapted to fix the position of the screw when once selected.

I claim:

1. A variable speed drive comprising a pair of spaced variable effective diameter pulleys rotatably mounted on fixed axes, a belt operating between the two pulleys, each pulley comprising pulley discs mounted to move alternatively away from and toward each other and a spring normally urging said discs toward each other, the belt operating between the discs, a pressure wheel disposed adjacent to each pulley wheel and adapted to engage the outer face of the belt, the pressure wheels and pulleys being disposed in a common plane, the width of each pressure wheel being less than the width of the belt, and means moving one pressure wheel alternatively toward and away from the adjacent pulley while simultaneously alternatively moving the other pressure wheel away and toward the other pulley, said pressure wheels being spaced from each other a distance exceeding the distance between extreme opposite faces of said belt whereby one or the other of said pressure wheels, but not both, engages the belt at all times.

2. A variable speed drive comprising a pair of spaced apart variable effective diameter pulleys rotatably mounted on fixed axes, a V-belt operating between the two pulleys and having a flat outwardly disposed face, each pulley comprising pulley discs having pitched sides and mounted to move alternatively away from and toward each other and a spring normally urging said discs toward each other, the belt operating between the discs with the V sides of the belt engaging the pitched sides of the discs, a pressure wheel disposed adjacent to each pulley wheel and adapted to engage the flat side of the belt, the pressure wheels and pulleys being disposed in a common plane, the width of each pressure wheel being less than the width of the belt, and means moving one pressure wheel alternatively toward and away from the adjacent pulley while simultaneously alternatively moving the other pressure wheel away and toward the other pulley, said pressure wheels being spaced from each other a distance exceeding distance between extreme opposite faces of said belt whereby one or the other of said pressure wheels, but not both, engages the belt at all times.

3. A variable speed drive comprising a pair of spaced variable effective diameter pulleys rotatably mounted on fixed axes, a belt operating between the two pulleys, each pulley comprising pulley discs mounted to move alternatively away from and toward each other and a spring normally urging said discs toward each other, the belt operating between the discs, a pressure wheel disposed adjacent to each pulley wheel and adapted to engage the outer face of the belt, the pressure wheels and pulleys being disposed in a common plane, the width of each pressure wheel being less than the width of the belt, and means moving one pressure wheel alternatively toward and away from the adjacent pulley while simultaneously alternatively moving the other pressure wheel away and toward the other pulley, said pressure wheels being spaced from each other a distance exceeding the distance between extreme opposite faces of said belt whereby one or the other of said pressure wheels, but not both, engages the belt at all times, and means for adjusting the spacing between the pressure wheels, said means comprising a pair of spaced arms each pivoted to a fixed point at one end and having a pressure wheel rotatably mounted at the other end and an adjustable length strut member connected between said arms.

GEORGE A. KOHOUT.

REFERENCES CITED

The following references are of record in the file of this patent:

UNITED STATES PATENTS

| Number | Name | Date |
|---|---|---|
| 1,209,717 | King | Dec. 26, 1916 |
| 1,236,749 | Osser | Aug. 14, 1917 |
| 2,032,585 | Lewellen | Mar. 3, 1936 |
| 2,254,592 | Berkeley | Sept. 2, 1941 |

FOREIGN PATENTS

| Number | Country | Date |
|---|---|---|
| 366,586 | Italy | June 3, 1939 |